United States Patent
Yasutake (10) Patent No.: US 8,347,296 B2
(45) Date of Patent: Jan. 1, 2013

(54) PRIORITY CONTROL APPARATUS AND PRIORITY CONTROL METHOD

(75) Inventor: Koichi Yasutake, Kyoto (JP)

(73) Assignee: Panasonic Corporation, Osaka (JP)

( * ) Notice: Subject to any disclaimer, the term of this patent is extended or adjusted under 35 U.S.C. 154(b) by 200 days.

(21) Appl. No.: 12/957,481

(22) Filed: Dec. 1, 2010

(65) Prior Publication Data

US 2011/0072435 A1      Mar. 24, 2011

Related U.S. Application Data

(63) Continuation of application No. PCT/JP2009/002354, filed on May 28, 2009.

(30) Foreign Application Priority Data

Jun. 2, 2008   (JP) .................................. 2008-144868

(51) Int. Cl.
*G06F 9/46*      (2006.01)
*G06F 9/48*      (2006.01)
(52) U.S. Cl. ........................................ 718/103; 718/100
(58) Field of Classification Search ........................ None
See application file for complete search history.

(56) References Cited

U.S. PATENT DOCUMENTS

| | | | |
|---|---|---|---|
| 7,788,668 B2 * | 8/2010 | Barker ........................... | 718/103 |
| 7,810,096 B2 * | 10/2010 | Saito et al. ..................... | 718/103 |
| 2005/0149933 A1 | 7/2005 | Saito et al. | |
| 2007/0067739 A1 | 3/2007 | Atarashi et al. | |

FOREIGN PATENT DOCUMENTS

| | | |
|---|---|---|
| JP | 8-77025 | 3/1996 |
| JP | 2000-242512 | 9/2000 |
| JP | 2000-322278 | 11/2000 |
| JP | 2002-163120 A | 6/2002 |
| JP | 2004-326486 A | 11/2004 |
| JP | 2005-173643 | 6/2005 |
| JP | 2007-86859 | 4/2007 |

OTHER PUBLICATIONS

Japanese Office Action issued in Japanese Patent Application No. 2008-144868 dated Oct. 23, 2012.

* cited by examiner

*Primary Examiner* — Qing Wu
(74) *Attorney, Agent, or Firm* — McDermott Will & Emery LLP (57) ABSTRACT

A priority control apparatus according to the present invention includes: an OS execution unit which executes first tasks that run on a first OS and second tasks that run on a second OS; a task priority obtainment unit which obtains the priority of an execution task which is a first task being executed by the OS execution unit and the priority of a requested task which is a second task whose execution is being requested to the OS execution unit; and a priority changing unit which, in the case where the priority of the requested task is higher than the priority of the execution task, changes the priorities of the first tasks to be lower than the priority of the requested task and higher than the next lower priority to the requested task among the second tasks, while maintaining the relative order of the priorities among the first tasks.

9 Claims, 7 Drawing Sheets

PRIORITY CONTROL APPARATUS AND PRIORITY CONTROL METHOD

CROSS REFERENCE TO RELATED APPLICATION

This is a continuation application of PCT application PCT/JP2009/002354 filed on May 28, 2009, designating the United States of America.

BACKGROUND OF THE INVENTION (1) Field of the Invention

The present invention relates to priority control apparatuses and priority control methods, and particularly to a priority control apparatus which controls priority of plural first tasks that run on a first OS and plural second tasks that run on a second OS.

(2) Description of the Related Art

Conventionally, in an operating system (OS) which executes plural tasks, a priority is set for each of the tasks, and the order in which the tasks are to be executed is determined according to the priorities.

Priority inversion is known to occur in such an OS. Priority inversion shall be described hereinafter.

When execution of a high priority task is requested during the execution of a low priority task, judgment is performed as to whether or not a resource to be used by the high priority task is being used (locked) by the currently-executed low priority task. When the resource to be used by the high priority task is not locked by the currently-executed task, the task to be executed is switched, in accordance with the priorities, to the high priority task.

On the other hand, when the resource to be used by the high priority task is locked by the currently-executed task, the currently-executed low priority task continues to be executed, and the high priority task is executed after the low priority task is finished.

Here, when execution of a medium priority task (a task having a priority that is lower than that of the high priority task and higher than that of the low priority task) is requested during the execution of the low priority task, and a resource to be used by the medium priority task is not locked by the low priority task, the OS interrupts the execution of the low priority task and executes the medium priority task, in accordance with the priorities. In other words, a priority inversion occurs in which the medium priority task is executed before the high priority task which should have been executed ahead. Thus there is the problem that real-timeliness is inhibited by such priority inversion.

A priority control apparatus described in Japanese Unexamined Patent Application Publication No. 8-77025 (Patent Reference 1) is known as a priority control apparatus for handling such priority inversions.

In the priority control apparatus described in Patent Reference 1, the priority of the currently-executed low priority task is temporarily raised such that, even when the execution of the medium priority task is requested, the request is not accepted and the execution of the low priority task is continued. With this, after the execution of the low priority task is finished, the high priority task is executed. In other words, the priority control apparatus is able to resolve the above-described priority inversion.

Meanwhile, recent years have seen the use of a computer system which runs plural OSs for implementing functions having different purposes. An example would be the case of running Windows® on Linux®.

SUMMARY OF THE INVENTION

However, when the technique described in Patent Reference 1 is applied to a system which executes plural OSs, the following problems arise.

Tasks executed in the respective OSs each have independent priorities within the respective OSs. In other words, although the priorities of the tasks are defined within the respective OSs, it is not necessarily the case that there is consistency in the priorities of the tasks between the OSs. As such, when the priority of a task is simply raised between OSs, there are instances where inter-OS system consistency cannot be maintained. With this, it is possible that priority inversion cannot be resolved or that other problems can occur.

Consequently, the present invention has as an object to provide a priority control apparatus and a priority control method which can resolve priority inversion and maintain system consistency in the case where plural OSs are executed.

In order to achieve the aforementioned object, the priority control apparatus according to the present invention is a priority control apparatus which controls priorities of first tasks that run on a first operating system (OS) and second tasks that run on a second OS, the priority control apparatus including: an execution unit configured to execute the first tasks and the second tasks; a task priority obtainment unit configured to obtain a priority of an execution task and a priority of a requested task, the execution task being a first task currently being executed by the execution unit, and the requested task being a second task whose execution is being requested to the execution unit; a priority judgment unit configured to judge whether or not the priority of the requested task is higher than the priority of the execution task; and a priority changing unit configured to change the priorities of the first tasks to be lower than the priority of the requested task and higher than a priority of a task having a next lower priority to the requested task among the second tasks while maintaining a relative order of the priorities among the first tasks, when the priority of the requested task is higher than the priority of the execution task.

According to this configuration, the priority control apparatus according to the present invention raises the priorities of all the first tasks that run on the first OS, when, during the execution of a first task, execution of second task having a higher priority than such first task is requested. With this, the priority control apparatus is able to resolve priority inversion.

In addition, by raising the priorities of all the first tasks that run on the first OS while maintaining the relative order of the priorities among the first tasks, the priority control apparatus according to the present invention is able to preferentially execute the series of first tasks related to the currently-executed first task. With this, task priority conformity can be maintained within an OS even when plural OSs are executed. Therefore, the priority control apparatus according to the present invention is able to resolve priority inversion and maintain system consistency even when plural OSs are executed.

Furthermore, the priority control apparatus may further include a resource judgment unit configured to judge whether or not a resource to be used in the execution of the requested task is being used in the execution of the execution task, wherein the priority changing unit may be configured to change the priorities of the first tasks to be lower than the priority of the requested task and higher than the priority of the task having the next lower priority to the requested task among the second tasks while maintaining the relative order of the priorities among the first tasks, when the priority of the requested task is higher than the priority of the execution task and the resource to be used in the execution of the requested task is being used in the execution of the execution task.

According to this configuration, the priority control apparatus according to the present invention performs priority changing when the resource to be used in the execution of the requested task is being used in the execution of the execution task. With this, the priority control apparatus according to the present invention is able to perform priority changing only when priority inversion occurs.

Furthermore, the priority control apparatus may further include a status judgment unit configured to judge whether or not the requested task is in an execution-waiting state, wherein the priority changing unit may be configured to change the priorities of the first tasks to be lower than the priority of the requested task and higher than the priority of the task having the next lower priority to the requested task among the second tasks while maintaining the relative order of the priorities among the first tasks, when the priority of the requested task is higher than the priority of the execution task and the requested task is in the execution-waiting state.

According to this configuration, the priority control apparatus according to the present invention performs priority changing when the requested task is in the waiting state. With this, the priority control apparatus according to the present invention is able to perform priority changing only when priority inversion occurs.

Furthermore the priority control apparatus may further include: a corresponding-task setting unit in which one of the first tasks and a second task corresponding to the one first task are set; and a task judgment unit configured to judge whether or not the execution task is the first task set in the corresponding-task setting unit, and to judge whether or not the requested task is the second task corresponding to the execution task set in the corresponding-task setting unit, wherein the priority changing unit may be configured to change the priorities of the first tasks to be lower than the priority of the requested task and higher than the priority of the task having the next lower priority to the requested task among the second tasks while maintaining the relative order of the priorities among the first tasks, when the priority of the requested task is higher than the priority of the execution task, the execution task is the first task set in the corresponding-task setting unit, and the requested task is the second task corresponding to the execution task set in the corresponding-task setting unit.

According to this configuration, the priority control apparatus according to the present invention performs priority changing when the requested task and the execution task are a predetermined combination. With this, the priority control apparatus according to the present invention need not perform a process of checking the lock status of a resource or the operational state of a task, and is thus able to reduce the amount of processing.

Furthermore, the priority control apparatus may further include a user input unit configured to receive an input of a user, wherein the task judgment unit may be configured to judge whether or not the execution task is a task which executes a process received by the user input unit, and the priority changing unit may be configured to change the priorities of the first tasks to be lower than the priority of the requested task and higher than the priority of the task having the next lower priority to the requested task among the second tasks while maintaining the relative order of the priorities among the first tasks, when the priority of the requested task is higher than the priority of the execution task, the execution task is a task which executes a process received by the user input unit, and the requested task is the second task corresponding to the execution task set in the corresponding-task setting unit.

According to this configuration, the priority control apparatus according to the present invention performs priority changing when a user input which often entails performance of a predetermined process such as image display is received. With this, the priority control apparatus according to the present invention need not perform a process of checking the lock status of a resource or the operational state of a task, and is thus able to reduce the amount of processing.

Furthermore, the priority changing unit may be configured to restore the priority of the execution task to the priority prior to the changing, after the execution of the execution task is finished.

Furthermore, the priority control apparatus may further include a task request detection unit configured to detect an execution request directed to the execution unit to execute a second task, wherein, when the task request detection unit detects the execution request for the second task, the priority obtainment unit may be configured to obtain the priority of the execution task and the priority of the requested task for which the execution request has been detected, the priority judgment unit may be configured to judge whether or not the priority of the requested task is higher than the priority of the execution task, and the priority changing unit may be configured to change the priorities of the first tasks to be lower than the priority of the requested task and higher than the priority of the task having the next lower priority to the requested task among the second tasks while maintaining the relative order of the priorities among the first tasks, when the priority of the requested task is higher than the priority of the execution task.

According to this configuration, the priority control apparatus according to the present invention is able to perform priority changing when an execution request for a task such as an interrupt arises.

Furthermore, the priority control method according to the present invention is a priority control method performed by a priority control apparatus which controls priorities of first tasks that run on a first operating system (OS) and second tasks that run on a second OS and includes an execution unit which executes the first tasks and the second tasks, the priority control method including: obtaining a priority of an execution task and a priority of a requested task, the execution task being a first task currently being executed by the execution unit, and the requested task being a second task whose execution is being requested to the execution unit; judging whether or not the priority of the requested task is higher than the priority of the execution task; and changing priorities of the first tasks to be lower than the priority of the requested task and higher than a priority of a task having a next lower priority to the requested task among the second tasks while maintaining a relative order of the priorities among the first tasks, when the priority of the requested task is higher than the priority of the execution task.

According to this configuration, with the priority control method according to the present invention, the priorities of all the first tasks that run on the first OS are raised, when, during the execution of a first task, execution of second task having a higher priority than such first task is requested. Accordingly, with the priority control method, priority inversion can be resolved.

In addition, by raising the priorities of all the first tasks that run on the first OS while maintaining the relative order of the priorities among the first tasks, the priority control method according to the present invention allows for the preferential execution of the series of first tasks related to the currently-executed first task. With this, task priority conformity can be maintained within an OS even when plural OSs are executed. Therefore, with the priority control method according to the present invention, it is possible to resolve priority inversion and maintain system consistency even when plural OSs are executed.

It should be noted that the present invention can be implemented, not only as a priority control apparatus such as that described herein, but also as a priority control method having, as steps, the characteristic units included in such priority control apparatus, or as a program causing a computer to execute such characteristic steps. In addition, it goes without saying that such a program can be distributed via a non-transitory computer-readable recording medium such as a CD-ROM and via a transmitting medium such as the Internet.

As described above, the present invention can provide a priority control apparatus and a priority control method which can resolve priority inversion and maintain system consistency in the case where plural OSs are executed.

FURTHER INFORMATION ABOUT TECHNICAL BACKGROUND TO THIS APPLICATION

The disclosure of Japanese Patent Application No. 2008-144868 filed on Jun. 2, 2008 including specification, drawings and claims is incorporated herein by reference in its entirety.

The disclosure of PCT Application No. PCT/JP2009/002354 filed on May 28, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Hereinafter, embodiments of a priority control apparatus according to the present invention shall be described with reference to the Drawings.

First Embodiment

In a priority control apparatus according to a first embodiment of the present invention, when, during execution of a task in a first OS, execution of a task of a second OS which has a higher priority than the currently-executed task is requested and a resource to be used by the requested task is currently locked by the currently-executed task, the priorities of all the tasks of the first OS are raised. With this, the priority control apparatus according to the first embodiment of the present invention is able to resolve priority inversion and maintain system consistency in the case where plural OSs are executed.

First, the configuration of the priority control apparatus according to the first embodiment of the present invention shall be described.

Figure 1:
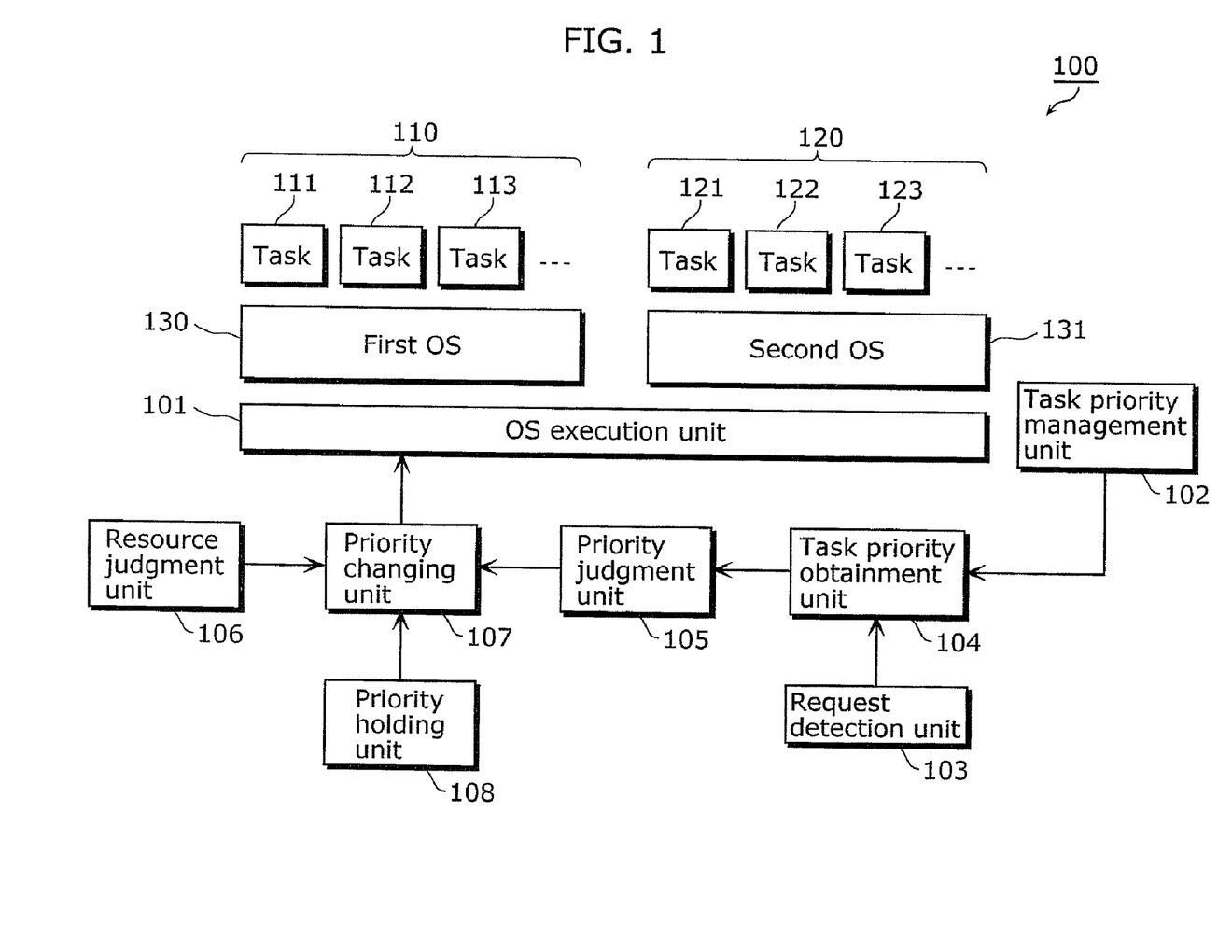
FIG. 1 is a block diagram showing the configuration of a priority control apparatus according to a first embodiment of the present invention.

FIG. 1 is a diagram showing the configuration of the priority control apparatus according to the first embodiment of the present invention.

A priority control apparatus 100 shown in FIG. 1 controls the priorities of each of plural tasks that run on plural OSs. The priority control apparatus 100 includes an OS execution unit 101, a task priority management unit 102, a request detection unit 103, a task priority obtainment unit 104, a priority judgment unit 105, a resource judgment unit 106, a priority changing unit 107, and a priority holding unit 108.

The OS execution unit 101 executes a first OS 130 and a second OS 131. Tasks 110 are executed on the first OS 130, and tasks 120 are executed on the second OS 131. When execution of tasks 110 and 120 are simultaneously requested, the OS execution unit 101 preferentially executes the one of the tasks 110 and 120 having the highest priority. The tasks 110 include tasks 111, 112, 113, . . . . The tasks 120 include tasks 121, 122, 123, . . . .

The task priority management unit 102 holds the priority relationship of the tasks 110 and 120.

Figure 2A:
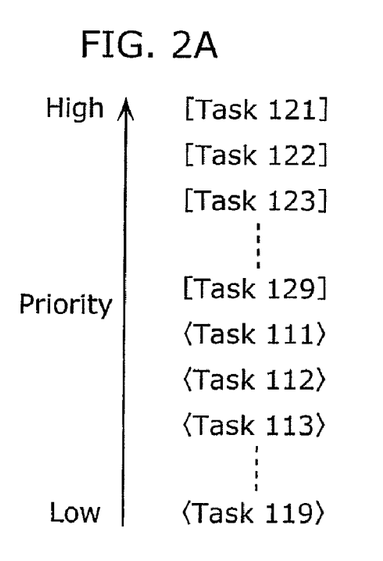
FIG. 2A is a diagram showing an example of priorities according to the first embodiment of the present invention.

FIG. 2A is diagram showing an example of the priority relationship held by the task priority management unit 102. As shown in FIG. 2A, for example, the priorities of the tasks 120 are set higher than the priorities of the tasks 110. Furthermore, in the tasks 120, priorities are set, from the highest, in the order of tasks 121, 122, 123, . . . . Furthermore, in the tasks 110, priorities are set, from the highest, in the order of tasks 111, 112, 113, . . . .

The request detection unit 103 detects an execution request for a task such as an interrupt, intended for the OS execution unit 101.

The task priority obtainment unit 104 obtains the priority of a task 110 or 120 being executed (hereafter referred to as execution task) by the OS execution unit 101, when the request detection unit 103 detects a task execution request. The task priority obtainment unit 104 obtains the priority of the task 110 or 120 whose execution is being requested (hereafter referred to as requested task) to the OS execution unit 101, by referring to the priority relationship held by the task priority management unit 102. The task priority obtainment unit 104 obtains the priority of the execution task and the priority of the requested task, when the request detection unit 103 detects an execution request.

The priority judgment unit 105 judges whether or not the priority of the requested task obtained by the task priority obtainment unit 104 is higher than the priority of the execution task.

The resource judgment unit 106 judges whether or not a resource to be used in the execution of the requested task is being used in the execution of the execution task. In other words, the resource judgment unit 106 judges whether or not the resource to be used in the execution of the requested task is currently locked by the execution task.

When, during the execution of a task that runs on one of the OSs out of the first OS 130 and the second OS 131, execution of a task of the other OS is requested, that is, when one out of the execution task and the requested task is a task 110 and the other is the task 120, and the priority judgment unit 105 judges that the priority of the requested task is higher than the priority of the execution task, and the resource judgment unit 106 judges that the resource to be used in the execution of the requested task is being used in the execution of the execution task, the priority changing unit 107 raises the priorities of all the tasks 110 or tasks 120 in which the execution task is included.

For example, when the execution of the task 121 is requested during the execution of the task 112, the priority changing unit 107 raises the priorities of all of the tasks 111, 112, 113, . . . .

Figure 2B:
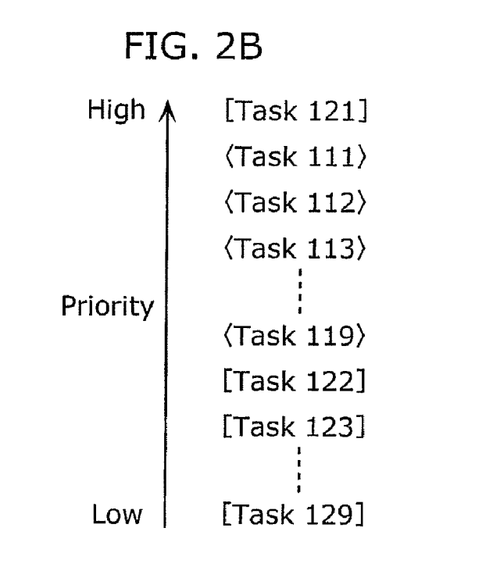
FIG. 2B is a diagram showing an example of the priorities after changing by the priority control apparatus according to the first embodiment of the present invention.

FIG. 2B is a diagram showing an example of priorities that have been changed by the priority changing unit 107. As shown in FIG. 2B, the priority changing unit 107 changes the priorities of the tasks 110 so as to be immediately below the priority of the task 121, that is, lower than the task 121 and higher than the priority of the task 122 which has the next lower priority to the task 121 among the tasks 120. Furthermore, the priority changing unit 107 raises the priorities of the tasks 110 while maintaining the relative order of priorities among the tasks 110.

The priority holding unit 108 holds the priority relationship of the tasks 110 and 120 prior to the changing by the priority changing unit 107.

Furthermore, when priorities are changed, the priority changing unit 107 changes the priorities of the tasks 110 and 120 to the priorities held by the priority holding unit 108, after the execution of the execution task is finished. Specifically, after the execution of the execution task is finished, the priority changing unit 107 restores the priorities of the tasks 110 to the priorities prior to the change.

Next, the operation of the priority control apparatus 100 shall be described.

Figure 3:
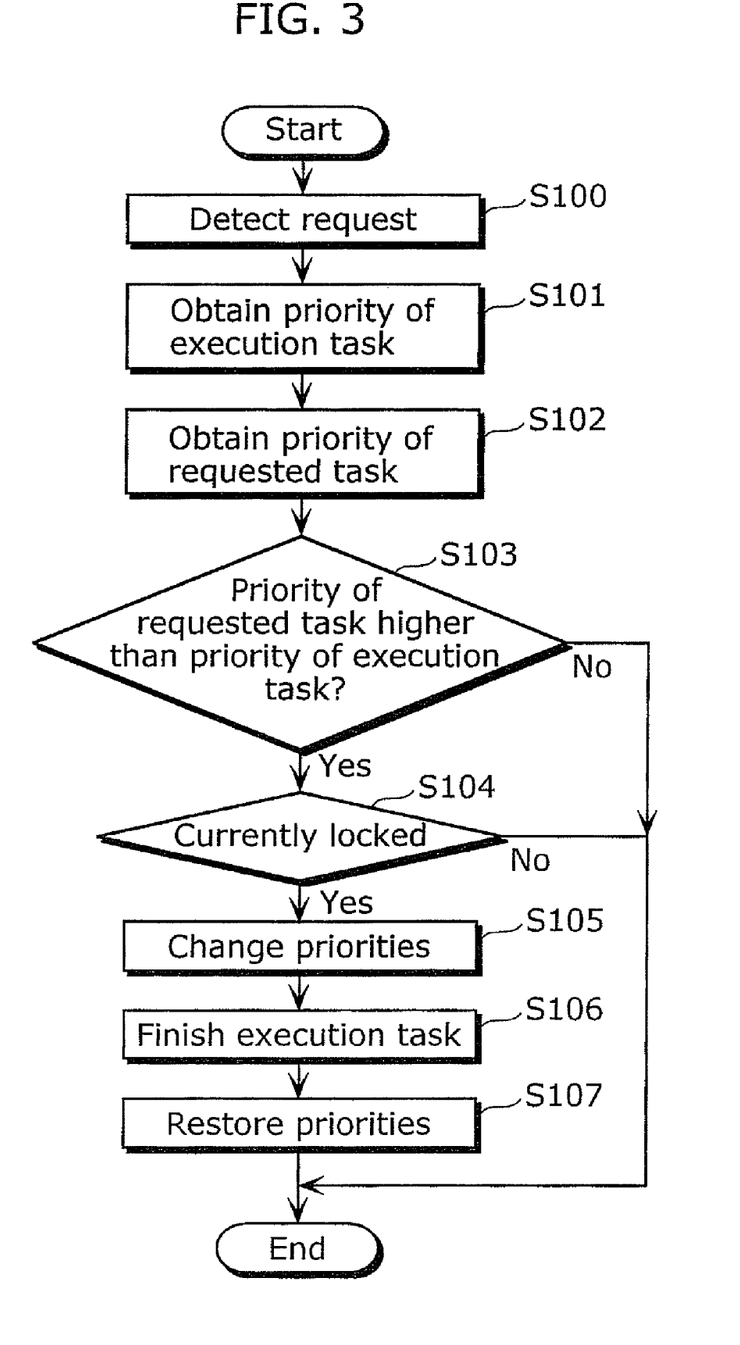
FIG. 3 is a flowchart showing the flow of the priority changing performed by the priority control apparatus according to the first embodiment of the present invention.
Figure 4A:
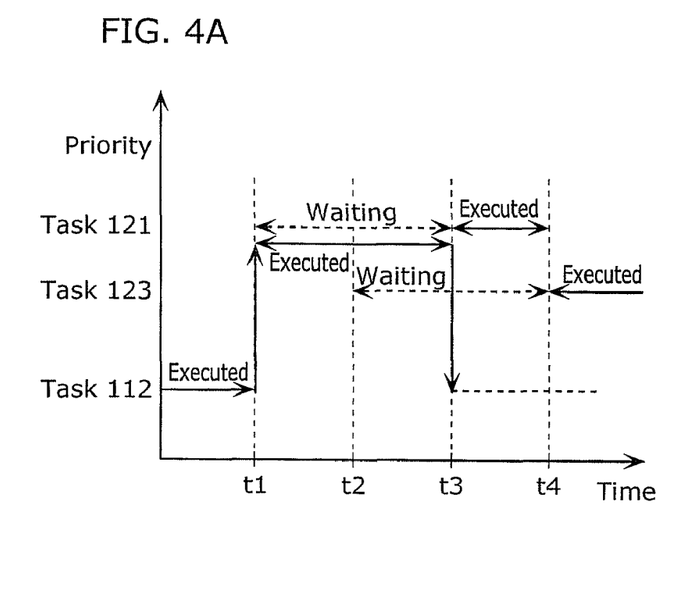
FIG. 4A is a diagram showing the status of the tasks executed by the priority control apparatus according to the first embodiment of the present invention.

FIG. 3 is a flowchart showing the flow of the priority control operation performed by the priority control apparatus 100. FIG. 4A is a diagram showing the status of the tasks executed by the OS execution unit 101.

Hereinafter, the operation in the case where the execution of the task 121 is requested during the execution of the task 112 shall be described using FIG. 3 and FIG. 4A. Furthermore, it is assumed that the priority relationship shown in FIG. 2A is set. Moreover, FIG. 4A shows the status of the tasks when the resource to be used by the task 121 is locked by the task 112.

The task 112 is being executed by the OS execution unit 101 previous to a time t1.

At the time t1, the execution of the task 121 is requested. The request detection unit 103 detects the execution request for the task 121 (S100). The task priority obtainment unit 104 obtains the priority of the task 112 currently being executed, in response to the detection of the execution request by the request detection unit 103 (S101). Furthermore, the task priority obtainment unit 104 obtains the priority of the task 121 for which execution is being requested (S102).

Next, the priority judgment unit 105 judges whether or not the priority of the task 121 is higher than the priority of the task 112 (S103).

Here, since the priority of the task 121 is higher than the priority of the task 112 (Yes in S103), subsequently, the resource judgment unit 106 judges whether or not the resource to be used by the task 121 is locked by the task 112 (S104).

Since the resource to be used by the task 121 is locked by the task 112 (Yes in S104) and the task 112 and the task 121 are tasks on different OSs, the priority changing unit 107 raises the priorities of the tasks 110 up to a priority immediately below the task 121 as shown in FIG. 2B (S105). The priority holding unit 108 holds the priorities prior to the changing by the priority changing unit 107.

Furthermore, since the resource to be used by the task 121 is locked by the task 112 at the time t1, the OS execution unit 101 continues the execution of the task 112 and causes the task 121 to wait.

At a time t2, the execution of the task 123 is requested. Since the priority of the task 112 currently being executed is higher compared to the priority of the newly requested task 123, the OS execution unit 101 continues the execution of the task 112 and causes the task 123 to wait.

At a time t3, the execution of the task 121 is finished (S106). The priority changing unit 107 restores the priorities of the tasks 110 that have been changed in step S106 to the original priorities held by the priority holding unit 108 (S107).

Furthermore, since the resource used by the task 112 is released and the priority of the waiting task 121 is higher than the priority of the waiting task 123 at the time t3, the OS execution unit 101 executes the task 121.

Subsequently, at a time t4, the execution of the task 121 is finished, and the OS execution unit 101 then executes the task 123.

On the other hand, when the priority of the task 121 is lower than the priority of the task 112 in step S103 (No in S103), or when the resource to be used by the task 121 is not locked by the task 112 in step S104 (No in S104), the priority changing unit 107 does not change the priorities of the tasks.

Hereinafter, the operation in the case where the priorities are not changed shall be described for the sake of comparison.

Figure 4B:
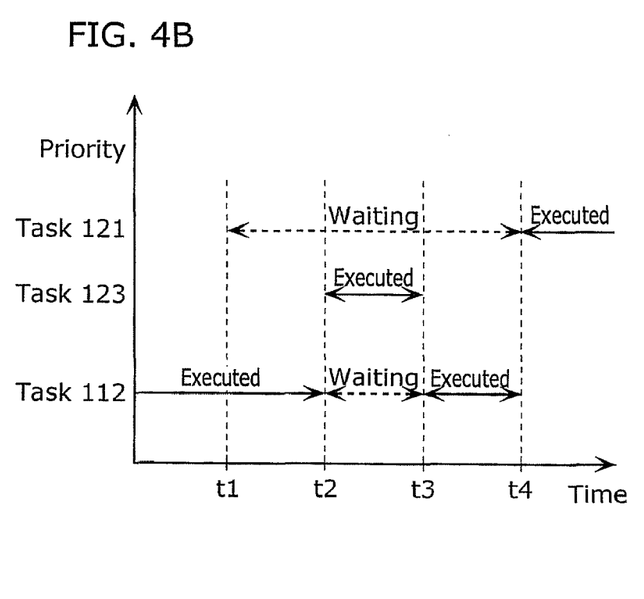
FIG. 4B is a diagram showing the status of the tasks when priority changing is not performed by the priority control apparatus according to the first embodiment of the present invention.

FIG. 4B is a diagram showing the status of the tasks executed by the OS execution unit 101 in the case where priorities are not changed.

In the case where priorities are not changed as shown in FIG. 4B, when the execution of the task 123 is requested at the time t2, the OS execution unit 101 executes the task 123 having a higher priority than the task 112 currently being executed, and causes the task 112 to wait.

At the time t3, the execution of the task 123 is finished, and the OS execution unit 101 then resumes the execution of the task 112.

Since the finishing of the execution of the task 112 at a time t4 causes the resource used by the task 112 to be released, the OS execution unit 101 executes the task 121.

In this manner, in the case where priorities are not changed, the task 123 having a lower priority than the task 121 is executed ahead of the task 121. With this, the execution of the higher priority task 121 is delayed. It should be noted that although the execution times of the task 121 and the task 123 are approximately the same in FIG. 4A and FIG. 4B, in a case where the execution time of the task 123, in particular, is long, the delay in the start of the execution of the task 121 becomes prominent.

As described above, with the priority control apparatus 100 according to the first embodiment of the present invention, when, during execution of a task 110 of the first OS 130, execution of a task 120 of the second OS 131 which has a higher priority than the task 110 is requested and the resource to be used by the requested task 120 is currently locked by the currently-executed task 110, the priorities of all the tasks 110 that run on the first OS 130 are raised. With this, the priority control apparatus 100 is able to resolve priority inversion.

In addition, by raising the priorities of all the tasks 110 that run on the first OS 130, the priority control apparatus 100 is able to maintain the consistency of the priorities of the tasks within an OS even when plural OSs are executed.

Specifically, in the execution of the task 112, the other task 113 which runs on the first OS 130 may be called and executed. In this case, when only the priority of the task 112 is raised, the newly requested task 123 is executed ahead when the task 113 is to be executed, and thus priority inversion occurs. On the other hand, with the priority control apparatus 100 according to the first embodiment of the present invention, the priorities of all the tasks 110 that run on the first OS 130 are raised, and thus, even when execution of a task having a lower priority than the task 121 is requested, such request is not accepted until the series of processes for the task 112 is finished. With this, the priority control apparatus 100 is able to resolve priority inversion even when plural OSs are executed.

It should be noted that although the example shown in FIG. 2A is given for the priority relationship of the tasks 110 and 120 in the preceding description, the priority relationship of the tasks 110 and 120 is not limited to such example.

Figure 2C:
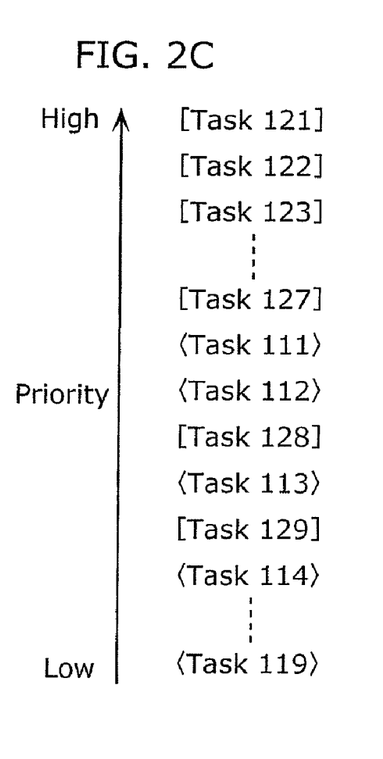
FIG. 2C is a diagram showing an example of priorities according to the first embodiment of the present invention.

FIG. 2C is a diagram showing another example of the priority relationship of the tasks 110 and 120. As shown in FIG. 2C, the order of the priorities of the tasks 110 and 120 may be mixed. In the example shown in FIG. 2C, when execution of the task 121 is requested during the execution of the task 112, the priority changing unit 107 changes the priorities as shown in FIG. 2B, in the same manner as in the above-described operation example.

Furthermore, when the priority of the requested task is higher than the priority of the execution task (Yes in S103) and the resource to be used by the requested task is locked by the execution task (Yes in S104), the priority changing unit 107 may, when the requested task and the execution task are tasks on the same OS, raise the priority of only the execution task out of the tasks on such OS, up to a priority that is immediately below the requested task.

Furthermore, although in the preceding description the priority changing unit 107 performs the priority changing depending on whether or not the resource is locked, the priority changing may be performed depending on whether or not the requested task is in the waiting state.

Figure 5:
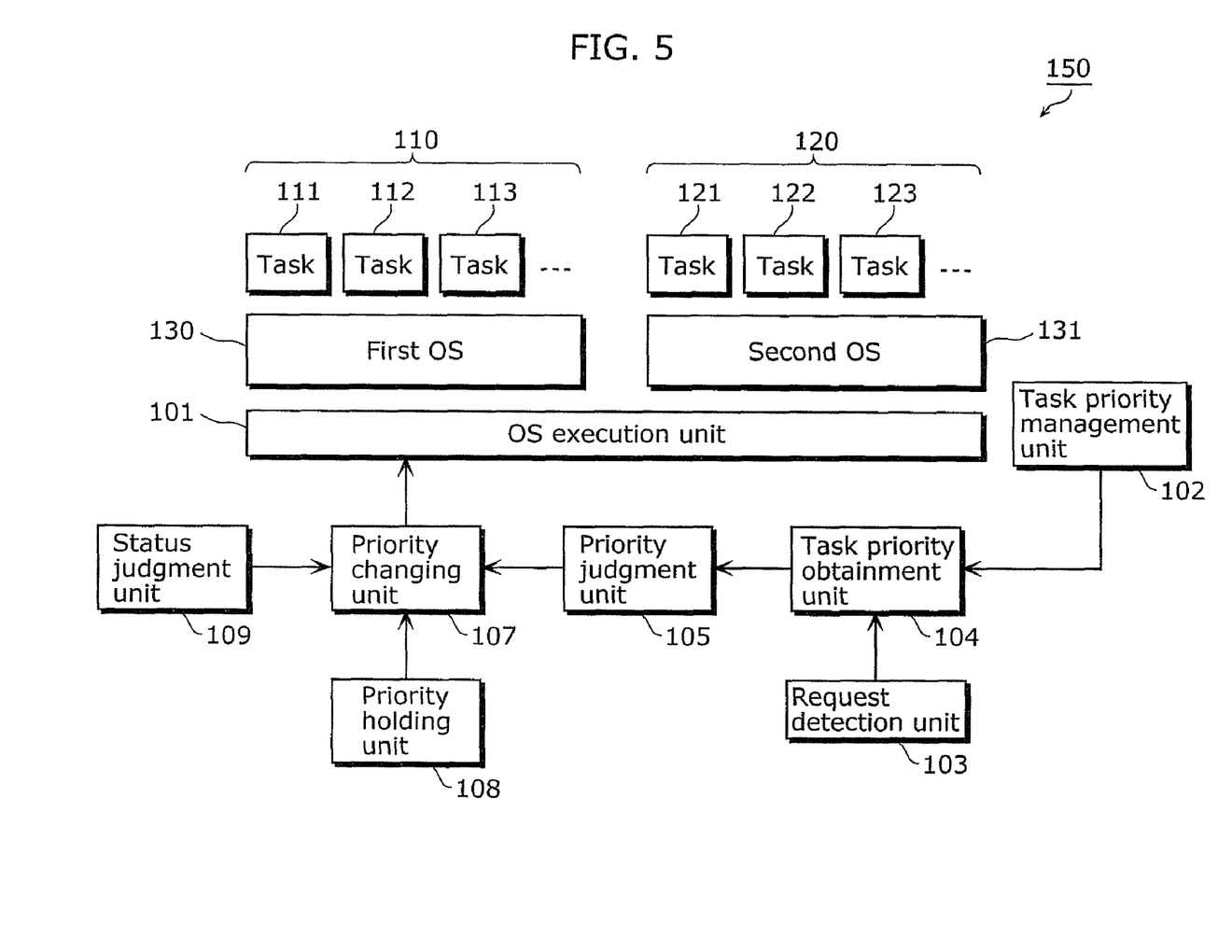
FIG. 5 is a block diagram showing the configuration of a modification of the priority control apparatus according to the first embodiment of the present invention.

FIG. 5 is a diagram showing the configuration of a modification of the priority control apparatus 100. Compared to the priority control apparatus 100, a priority control apparatus 150 shown in FIG. 5 includes a status judgment unit 109 in place of the resource judgment unit 106.

The status judgment unit 109 judges whether a requested task is in an execution-waiting state.

In a case where execution of a task of one of the OSs out of the first OS 130 and the second OS 131 is requested during the execution of a task that runs on the other of the OSs, the priority changing unit 107 raises the priorities of all of the tasks 110 or tasks 120 in which the execution task is included, when the priority judgment unit 105 judges that the priority of the requested task is higher than the priority of the execution task and the status judgment unit 109 judges that the requested task is in the execution-waiting state.

Furthermore, although in the preceding description the priority control apparatus 100 performs the judgment for whether or not to perform the priority changing and performs the priority changing (steps S101 to S105) when a request for the execution of a task such as an interrupt is detected, the judgment for whether or not to perform the priority changing and the priority changing (steps S101 to S105) may be performed on a predetermined cycle basis.

Furthermore, although in the preceding description step S104 (judgment for whether or not the resource is currently locked (or whether or not the requested task is in the waiting state)) is performed after the performance of step S103 (judgment for whether or not the priority of the requested task is higher than the priority of the execution task), step S103 may be performed after step S104 is performed, and part or all of the processes may be performed at the same time.

Second Embodiment

In a priority control apparatus according to a second embodiment of the present invention, priority changing is performed regardless of whether or not the resource is currently locked, with regard to the execution of a task based on a user input.

First, the configuration of the priority control apparatus according to the second embodiment of the present invention shall be described.

Figure 6:
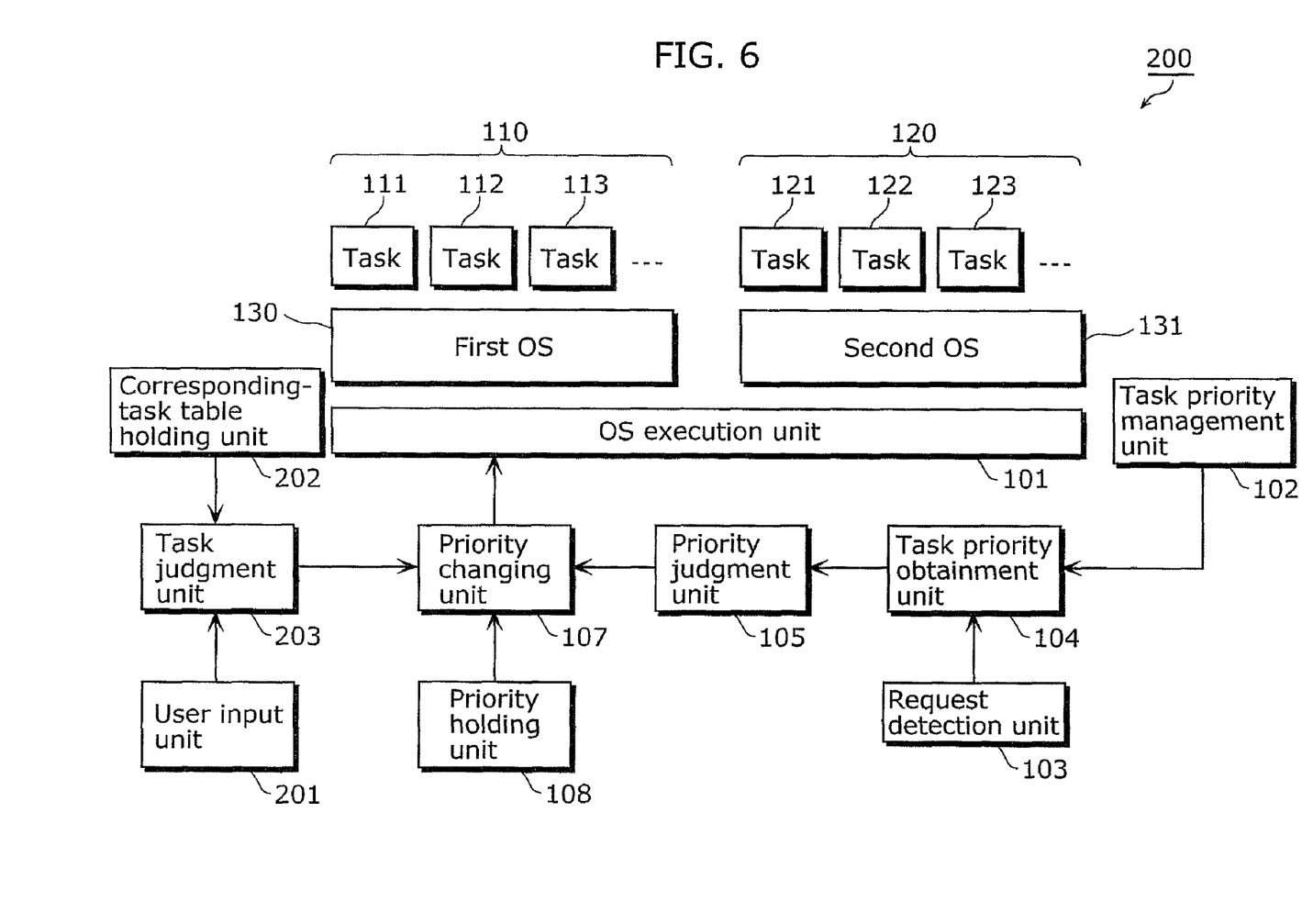
FIG. 6 is a block diagram showing the configuration of a priority control apparatus according to a second embodiment of the present invention.

FIG. 6 is a diagram showing the configuration of the priority control apparatus according to the second embodiment of the present invention. It should be noted that constituent elements that are the same as those in FIG. 1 are assigned the same reference numerals and overlapping descriptions shall be omitted.

A priority control apparatus 200 shown in FIG. 6 includes a user input unit 201 and a corresponding-task table holding unit 202 in addition to the configuration of the priority control apparatus 100 in the first embodiment, and includes a task judgment unit 203 in place of the resource judgment unit 106.

The user input unit 201 is a remote control or a keyboard, and so on, and receives an input of a user.

The corresponding-task table holding unit 202 holds a corresponding-task table in which (i) one or more among the tasks 100 and (ii) a task 120 corresponding to the one or more tasks 110 are set. Here, one of the corresponding tasks 110 and 120 that are set in the corresponding-task table is a task which executes a process received by the user input unit 201. Furthermore, the corresponding tasks that are set in the corresponding-task table are tasks which use the same resource.

Furthermore, in the corresponding-task table, a single task 120 may be set for a single task 110, or plural tasks 120 may be set for a single task 110, or a single task 120 may be set for plural tasks 110. Furthermore, the correspondence of plural pairs of the task 110 and 120 may be set in the corresponding-task table.

The task judgment unit 203 judges whether or not the execution task is a task which executes a process received by the user input unit 201. Furthermore, when the execution task is a task which executes a process received by the user input unit 201, the task judgment unit 203 judges whether or not the requested task is a task corresponding to such execution task set in the corresponding-task table.

When the priority of the requested task is higher than the priority of the execution task, and the task judgment unit 203 judges that the execution task is a task which executes a process received by the user input unit 201, and the task judgment unit 203 judges that the requested task is a task corresponding to such execution task set in the corresponding-task table, the priority changing unit 107 raises the priorities of all the tasks 110 or the tasks 120 in which the execution task is included. It should be noted that the method of raising the priorities of the tasks is the same as in the first embodiment.

Next, the operation of the priority control apparatus 200 shall be described.

Figure 7:
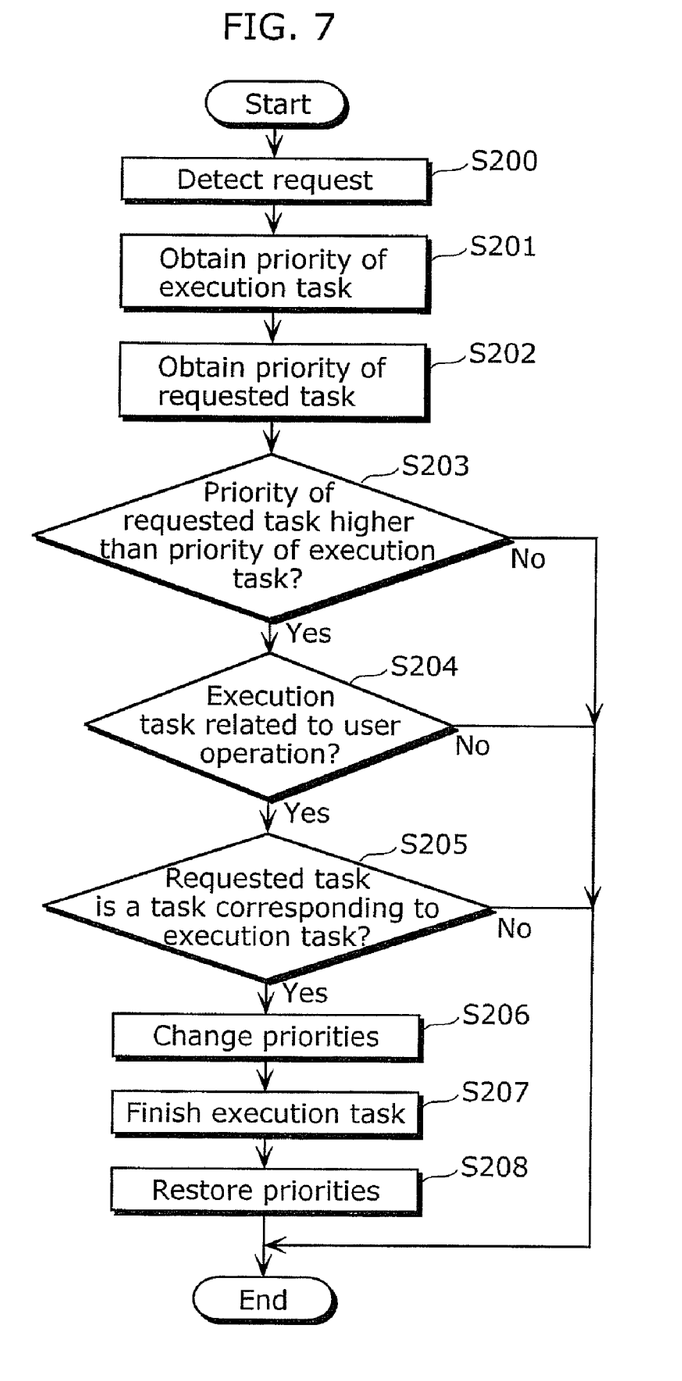
FIG. 7 is a flowchart showing the flow of the priority changing performed by the priority control apparatus according to the second embodiment of the present invention.

FIG. 7 is a flowchart showing the flow of the priority control operation performed by the priority control apparatus 200.

Hereinafter, the operation in the case where the execution of the task 121 is requested during the execution of the task 112 shall be described using FIG. 7. Furthermore, it is assumed that the priority relationship shown in FIG. 2A is set. Furthermore, description of operations which are the same as those in the first embodiment shall be omitted.

The operations in steps S200 to S203 are the same as the steps S100 to S103 shown in FIG. 3.

When the priority of the task 121 is higher than the priority of the task 112 in step S203 (Yes in S203), the task judgment unit 203 subsequently judges whether or not the task 112 is a task related to a user operation, that is, a task which executes a process received by the user input unit 201 (S204).

When the task 112 is a task which executes a process received by the user input unit 201 (Yes in S204), the task judgment unit 203 judges whether or not the task 121 is set, as a task corresponding to the task 112, in the corresponding-task table held by the corresponding-task table holding unit 202 (S205).

When the task 121 is set in the corresponding-task table as a task corresponding to the task 112 (Yes in S205), the priority changing unit 107 raises the priorities of the tasks 110 up to a priority that is immediately below the task 121 (S206). It is to be noted that the operations in steps S207 and S208 are the same as the steps S106 and S107 shown in FIG. 3.

On the other hand, when the task 112 is not a task which executes a process received by the user input unit 201 in step S204 (No in S204), or when the task 121 is not set in the corresponding-task table as a task corresponding to the task 112 (No in S205), the priority changing unit 107 does not change the priorities of the tasks.

As described above, with regard to the execution of a task based on a user input, the priority control apparatus 200 according to the second embodiment of the present invention changes priorities regardless of whether or not the resource is currently locked. Here, tasks based on a user input are mostly tasks related to image processing such as the displaying a menu, and so on. Therefore, in the corresponding-task table, a task related to similar image processing such as the displaying of an emergency caption is set as a corresponding task.

In this manner, the priority control apparatus 200 sets, in advance, a combination of tasks for which priority inversion is likely to occur due to the occurrence of resource conflict, and changes priorities when a task in such combination is executed or requested.

Accordingly, with the priority control apparatus 200, in addition to the advantageous effect of the priority control apparatus 100 according to the first embodiment, it is possible to reduce the amount of processing since the resource being used does not have to be checked.

It is to be noted that the same modification as in the above-described first embodiment can also be applied to the priority control apparatus 200 according to the second embodiment.

Furthermore, although in the preceding description the priority control apparatus 200 performs processing in the order of step S203 (judgment for whether or not the priority of the requested task is higher than the priority of the execution task), step S204 (judgment for whether or not the execution task is a task related to a user input), and step S205 (judgment for whether or not the requested task is a task corresponding to the execution task), the order for steps S203, S204, and S205 may be arbitrary. In addition part or all of the processes of steps S203, S204, and S205 may be performed at the same time.

Furthermore, although in the preceding description the priority changing unit 107 performs the priority changing depending on whether or not the execution task is a task related to a user input, the priority changing may be performed depending on whether or not the execution task is set in the corresponding-task table and regardless of whether or not the execution task is a task related to a user input. In other words, aside from a task related to a user input, a combination of tasks for which priority inversion is likely to occur due to the occurrence of resource conflict may be set in advance, and priority changing may be performed when a task in such combination is executed or requested.

Furthermore, the present invention may be implemented as a priority control apparatus having the functions in the first embodiment and the second embodiment. Specifically, the process in step S104 shown in FIG. 3 may be performed in the case of a "No" in step S204 or a "No" in step S205 in FIG. 7.

Furthermore, although the case where two OSs are executed is exemplified in the above-described first and second embodiments, the present invention can also be applied in the case where three or more OSs are executed.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to a priority control apparatus which controls priorities of tasks that run on plural OSs.

What is claimed is:

1. A priority control apparatus which controls priorities of first tasks that run on a first operating system (OS) and second tasks that run on a second OS, said priority control apparatus comprising:
    an execution unit configured to execute the first tasks and the second tasks;
    a task priority obtainment unit configured to obtain a priority of an execution task and a priority of a requested task, the execution task being a first task currently being executed by said execution unit, and the requested task being a second task whose execution is being requested to said execution unit;
    a priority judgment unit configured to judge whether or not the priority of the requested task is higher than the priority of the execution task; and
    a priority changing unit configured to change the priorities of the first tasks to be lower than the priority of the requested task and higher than a priority of a task having a next lower priority to the requested task among the second tasks while maintaining a relative order of the priorities among the first tasks, when the priority of the requested task is higher than the priority of the execution task.

2. The priority control apparatus according to claim 1, further comprising
    a resource judgment unit configured to judge whether or not a resource to be used in the execution of the requested task is being used in the execution of the execution task,
    wherein said priority changing unit is configured to change the priorities of the first tasks to be lower than the priority of the requested task and higher than the priority of the task having the next lower priority to the requested task among the second tasks while maintaining the relative order of the priorities among the first tasks, when the priority of the requested task is higher than the priority of the execution task and the resource to be used in the execution of the requested task is being used in the execution of the execution task.

3. The priority control apparatus according to claim 1, further comprising
a status judgment unit configured to judge whether or not the requested task is in an execution-waiting state,
wherein said priority changing unit is configured to change the priorities of the first tasks to be lower than the priority of the requested task and higher than the priority of the task having the next lower priority to the requested task among the second tasks while maintaining the relative order of the priorities among the first tasks, when the priority of the requested task is higher than the priority of the execution task and the requested task is in the execution-waiting state.

4. The priority control apparatus according to claim 1, further comprising:
a corresponding-task setting unit in which one of the first tasks and a second task corresponding to the one first task are set; and
a task judgment unit configured to judge whether or not the execution task is the first task set in said corresponding-task setting unit, and to judge whether or not the requested task is the second task corresponding to the execution task set in said corresponding-task setting unit,
wherein said priority changing unit is configured to change the priorities of the first tasks to be lower than the priority of the requested task and higher than the priority of the task having the next lower priority to the requested task among the second tasks while maintaining the relative order of the priorities among the first tasks, when the priority of the requested task is higher than the priority of the execution task, the execution task is the first task set in said corresponding-task setting unit, and the requested task is the second task corresponding to the execution task set in said corresponding-task setting unit.

5. The priority control apparatus according to claim 4, further comprising
a user input unit configured to receive an input of a user,
wherein said task judgment unit is configured to judge whether or not the execution task is a task which executes a process received by said user input unit, and
said priority changing unit is configured to change the priorities of the first tasks to be lower than the priority of the requested task and higher than the priority of the task having the next lower priority to the requested task among the second tasks while maintaining the relative order of the priorities among the first tasks, when the priority of the requested task is higher than the priority of the execution task, the execution task is a task which executes a process received by said user input unit, and the requested task is the second task corresponding to the execution task set in said corresponding-task setting unit.

6. The priority control apparatus according to claim 1, wherein said priority changing unit is configured to restore the priority of the execution task to the priority prior to the changing, after the execution of the execution task is finished.

7. The priority control apparatus according to claim 1, further comprising
a task request detection unit configured to detect an execution request directed to said execution unit to execute a second task,
wherein, when said task request detection unit detects the execution request for the second task, said priority obtainment unit is configured to obtain the priority of the execution task and the priority of the requested task for which the execution request has been detected,
said priority judgment unit is configured to judge whether or not the priority of the requested task is higher than the priority of the execution task, and
said priority changing unit is configured to change the priorities of the first tasks to be lower than the priority of the requested task and higher than the priority of the task having the next lower priority to the requested task among the second tasks while maintaining the relative order of the priorities among the first tasks, when the priority of the requested task is higher than the priority of the execution task.

8. A priority control method performed by a priority control apparatus which controls priorities of first tasks that run on a first operating system (OS) and second tasks that run on a second OS and includes an execution unit which executes the first tasks and the second tasks, said priority control method comprising:
obtaining a priority of an execution task and a priority of a requested task, the execution task being a first task currently being executed by said execution unit, and the requested task being a second task whose execution is being requested to said execution unit;
judging whether or not the priority of the requested task is higher than the priority of the execution task; and
changing priorities of the first tasks to be lower than the priority of the requested task and higher than a priority of a task having a next lower priority to the requested task among the second tasks while maintaining a relative order of the priorities among the first tasks, when the priority of the requested task is higher than the priority of the execution task.

9. A non-transitory computer-readable recording medium having a computer program recorded thereon for causing a priority control apparatus to execute a priority control method, the priority control apparatus controlling priorities of first tasks that run on a first operating system (OS) and second tasks that run on a second OS and including an execution unit which executes the first tasks and the second tasks, the program causing a computer to execute:
obtaining a priority of an execution task and a priority of a requested task, the execution task being a first task currently being executed by said execution unit, and the requested task being a second task whose execution is being requested to said execution unit;
judging whether or not the priority of the requested task is higher than the priority of the execution task; and
changing priorities of the first tasks to be lower than the priority of the requested task and higher than a priority of a task having a next lower priority to the requested task among the second tasks while maintaining a relative order of the priorities among the first tasks, when the priority of the requested task is higher than the priority of the execution task.

* * * * *